United States Patent [19]
Olderdissen et al.

[11] Patent Number: 5,388,240
[45] Date of Patent: Feb. 7, 1995

[54] DRAM CHIP AND DECODING ARRANGEMENT AND METHOD FOR CACHE FILLS

[75] Inventors: Ulrich Olderdissen, Herrenberg; Manfred Walz, Boblingen, both of Germany

[73] Assignee: International Business Machines Corporation, Armonk, N.Y.

[21] Appl. No.: 751,495

[22] Filed: Aug. 29, 1991

[30] Foreign Application Priority Data

Sep. 3, 1990 [EP] European Pat. Off. .......... 90116850

[51] Int. Cl.[6] .................. G06F 12/00; G06F 12/06; G06F 13/00; G06F 13/23
[52] U.S. Cl. .................. 395/400; 395/425; 364/239; 364/239.3; 364/243.4; 364/243.41; 364/254; 364/254.1; 364/DIG. 1
[58] Field of Search .............. 395/400, 425; 365/230.03

[56] References Cited

U.S. PATENT DOCUMENTS

| | | | |
|---|---|---|---|
| 3,588,829 | 6/1971 | Boland | 395/425 |
| 3,670,307 | 6/1972 | Arnold et al. | 395/425 |
| 3,705,388 | 12/1972 | Nishimoto | 395/425 |
| 3,806,888 | 4/1974 | Brickman et al. | 395/425 |
| 4,189,772 | 2/1980 | Liptay | 395/375 |
| 4,317,168 | 2/1982 | Messina et al. | 395/425 |
| 4,400,770 | 8/1983 | Chan et al. | 395/425 |
| 4,796,222 | 1/1989 | Aichelmann, Jr. et al. | 365/230.03 X |
| 4,992,979 | 2/1991 | Aichelmann, Jr. et al. | 395/230.03 X |
| 5,131,083 | 7/1992 | Crawford et al. | 395/275 |
| 5,226,147 | 7/1993 | Fujishima et al. | 395/425 |
| 5,255,378 | 10/1993 | Crawford et al. | 395/425 X |

FOREIGN PATENT DOCUMENTS 0054888 12/1980 European Pat. Off. .
0220535 10/1985 European Pat. Off. .

OTHER PUBLICATIONS

Gunther, "An Integrated Pre-Access Architecture for CMOS SRAM" IEEE Journal of Solid-State Circuits, vol. 27, No. 6 Jun. 92, pp. 901-907.

Primary Examiner—Jack B. Harvey
Assistant Examiner—Michael A. Whitfield
Attorney, Agent, or Firm—Floyd A. Gonzalez; James E. Murray

[57] ABSTRACT

A data mechanism having a random access memory (RAM) which has a plurality of groups of memory chips, each group being divisible into two equally sized chip sets. Each group of memory chips is addressed by a first address and each individual memory chip is addressed by a second address. The random access memory contains stored data. A cache, connected to the RAM, stores a portion of data stored in the RAM and is accessed by a cache address for separately reading requested data therefrom. The cache provides a cache miss signal when it does not contain the requested data. A CPU, connected to the cache and the RAM, receives the cache miss signal and provides responsive thereto, a starting address to the random access memory for starting a block transfer from the random access memory to the cache in two shots. The starting address includes the first address and the second address. The starting address identifies the group and individual chip within the group which contains the first bit which, when attempted to be read from the cache, caused the cache miss signal. A decoder, connected to the CPU and the random access memory, receives the starting address from the CPU and enables a first block data transfer from a first chip set in a first shot of the two shots starting from said first bit which caused the cache miss signal, and further enables a second block data transfer from a second chip set in a second of the shots.

3 Claims, 5 Drawing Sheets

L = LINE LENGTH (L = TX X W)
W = DATA BUS WIDTH (BETWEEN MULTIPLEXER AND CACHE)
TX = NUMBER OF DATA TRANSFERS (BETWEEN MULTIPLEXER AND CACHE)
E = ELEMENT (SMALLEST ADDRESSABLE NUMBER OF BITS IN A LINE)
W0..W7 = DATA TRANSFERS BETWEEN MULTIPLEXER AND CACHE.
Wn = ONE DATA TRANSFER WITH THE DATA BUS WIDTH W.

DRAM CHIP AND DECODING ARRANGEMENT AND METHOD FOR CACHE FILLS

BACKGROUND OF THE INVENTION

The invention relates to an improvement in the chip addressing and selecting controls for a processor memory with cache in a data processing system.

The most commonly used cache directory found in current commercial computer systems is a hardware matrix in which the matrix rows contain respective cache congruence classes, in which each cache class has a plurality of associative entries, and each entry is capable of containing a main storage address representation for a line of words in an associated cache data storage array. The directory entries may be conceptually considered to be arranged in the respective columns (i.e. sets) of the matrix. The entries in any row found in the different columns are set-associative, In the prior art, U.S. Pat. No. 3,705,388 interrupts main storage while it is transferring a line of data to a cache to permit a processor (CPU) to access a different line of data in the cache. U.S. Pat. Nos. 3,670,307 and 3,670,309 enable concurrent processor and line fetch accesses by accessing different basic storage modules (BSMs) in the cache; that is, the processor can access the busses of one BSM of a cache concurrently with a line fetch from main storage accessing the different busses of another BSM of the cache, which must be constructed with plural BSMs. U.S. Pat. No. 3,588,829 delays a processor request to the cache from the first word of a line transfer until after the last word of the line fetch is completed from main storage to the cache. U.S. Pat. No. 3,806,888 provides fast readout means in the main memory so that on each line of data can be transferred through a buffer to a cache in the time normally required to transfer word from main memory.

The unit of data transferred between main memory and cache of a general purpose computer is called a "cache line". Each cache line consists of one or more elements; the number of elements (E) in a cache line is known as the line length L. The width of the data path between main memory and cache is called W. This implies that the transfer of a cache line takes L/W transfers on the data path.

An undesirable delay occurs when:
a) the line length L is a multiple of the data path width W
b) the data path width W is a multiple of the element length E
c) the cache line load is caused by the CPU trying to access a string of elements that is currently not in the cache and that is not longer than L.

The solution to this problem according to the above mentioned prior art is to load the cache line starting with the W elements, aligned on a W-element boundary, containing the first of the elements that caused the cache miss. The boundary alignment restriction is introduced to simplify the hardware design. The problem is that the CPU might need a string of elements contained in W1 or W2 or W3 or W5 or W6 or W7. In this case the CPU has to wait for the second, third or fourth data transfer to be completed before it can proceed.

Therefore it is an object of this invention to provide a method of the chip addressing and selecting controls in the main memory of a data processor system including a cache by avoiding the unwanted wait transfers.

Another object of the invention is to provide a hardware solution for the method of the invention, using very moderate additional hardware means.

SUMMARY OF THE INVENTION

Disclosed in a data mechanism having a random access memory which has a plurality of groups of memory chips, each group being divisible into two equally sized chip sets. Each group of memory chips is addressed by a first address and each individual memory chip is addressed by a second address. The random access memory contains stored data. A cache is included which is connected to the random access memory and has stored therein a portion of data stored in the random access memory and is accessed by a cache address for separately reading requested data therefrom. The cache further provides a cache miss signal when it does not contain the requested data. A CPU means is included which is connected to the cache and the random access memory and receives the cache miss signal and provides responsive thereto, a starting address to the random access memory for starting a block transfer from the random access memory to the cache in two shots. The starting address includes the first address and the second address. The starting address identifies the group and individual chip within the group which contains the first bit which, when attempted to be read from the cache, caused the cache miss signal. A decoder is included which is connected to the CPU and the random access memory for receiving said starting address from the CPU and enables a first block data transfer from a first chip set in a first shot of the two shots starting from said first bit which caused the cache miss signal, and further enables a second block data transfer from a second chip set in a second of the shots. The second chip set includes the memory chips remaining in the memory group addressed by said first address whose data was not transferred in the first shot. A data buffer is connected to the random access memory and the decoder for storing the data transferred from the group of memory chips in the two shots. A multiplexer is connected to the buffer and the cache for serially transferring data from the data buffer to the cache. The multiplexer starts the serial transfer of data from the start of the data transferred from said first set of chips at the beginning of said second shot.

In accordance with one preferred embodiment of the present invention, an improved method of addressing and selecting controls for a processor memory with cache in a data processing system and a common address decoder of the memory and a buffer is disclosed. This method is characterized by selecting the memory chips (e.g. 0–7), one bit of each memory chip of a bit group independently from each other, loading a cache line by starting exactly with the first bit of a group which caused the cache miss, followed by the next transfers (W . . . ) (Δ) and performing L/W transfers on the data path for a cache line.

DESCRIPTION OF THE DRAWINGS

The foregoing and other objects, features and advantages of the invention will be apparent from the following more particular description of the embodiments of the invention as illustrated in the drawing, in which.

DESCRIPTION OF THE PREFERRED EMBODIMENT

Figure 1:
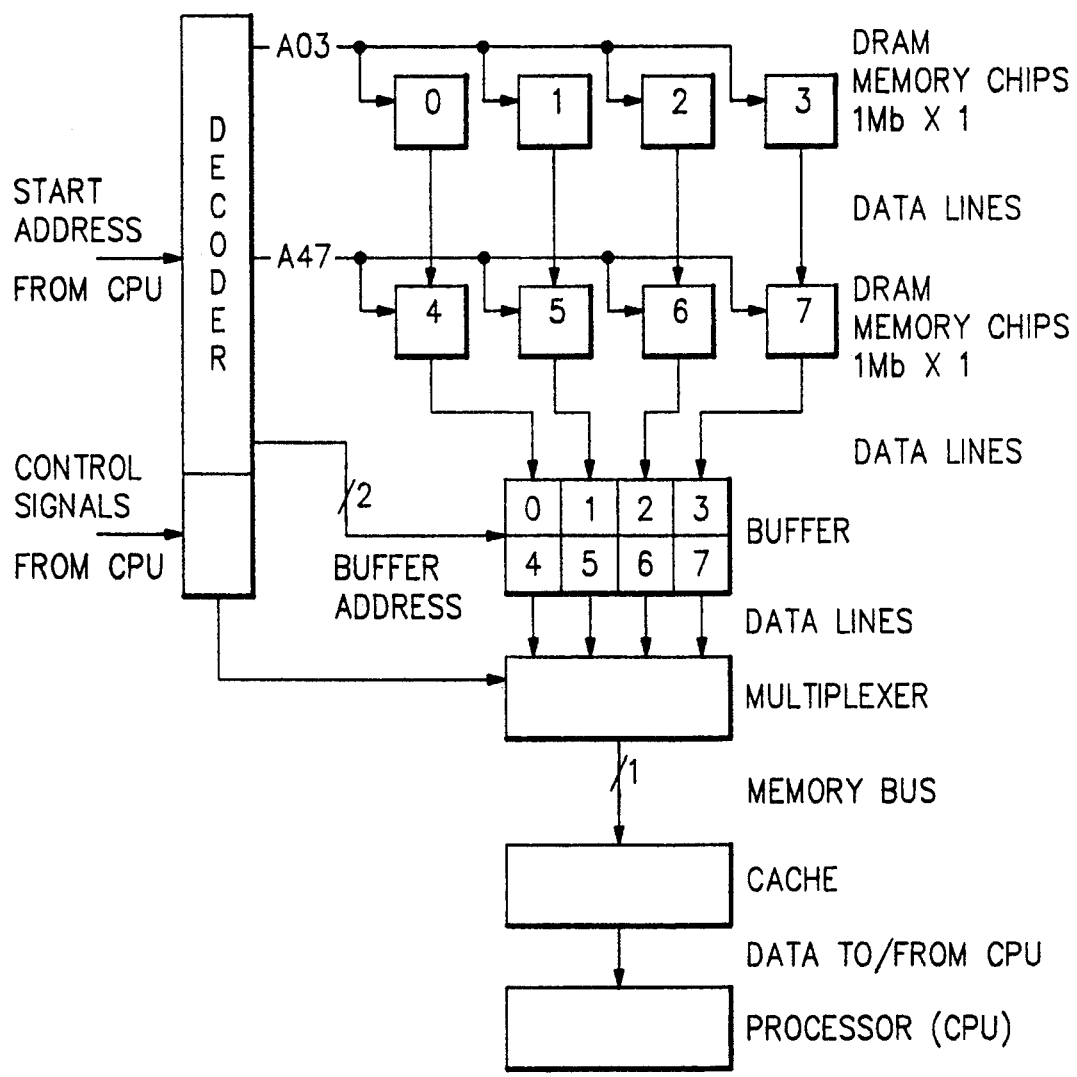
FIG. 1 illustrates a prior art decoder of a memory with cache.
Figure 5:
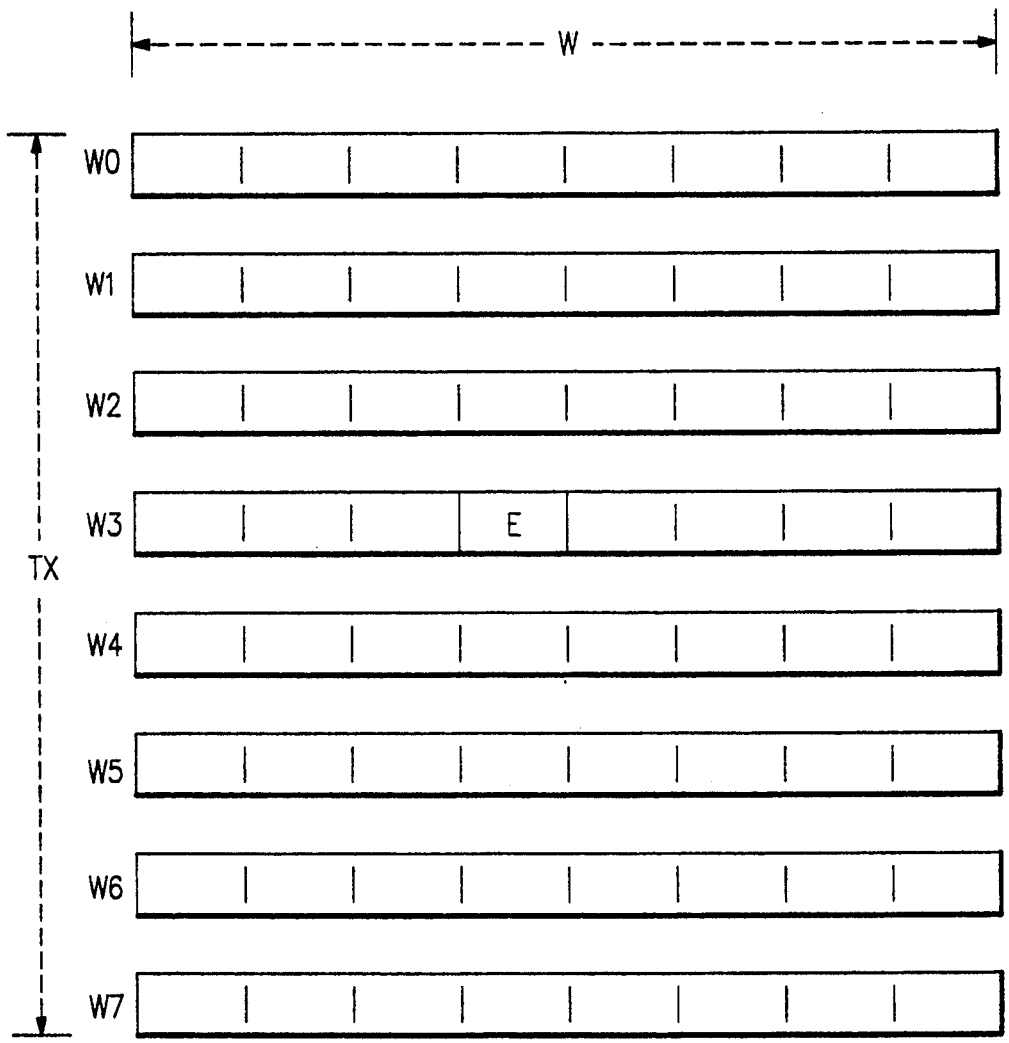
FIG. 5 is a diagram illustrating the parameters discussed.

The description is based on the simplified diagram shown in FIG. 1. These diagrams show only one data bit out of the data bus width W (see FIG. 5). The CPU provides the address of the data required and the appropriate control signals to the main memory, to transfer data to the buffer. The buffer is eight bits wide. The buffer is filled in two separate accesses or "shots" of the main memory where each shot provides 4 data bits. In FIG. 1 the 4 data bits of each shot are accessed by a different row or word line of the memory. The decoder decodes the address information and activates address A03 to select the first row of four DRAM memory chips in parallel (DRAM bits 0 to 3). Each DRAM chip provides one data bit. These four data bits are then stored in buffer cells 0 to 3 by activating the corresponding buffer address (shot 1). Subsequently, the decoder selects the second row of DRAM chips (4 to 7), storing them in the buffer cells 4 to 7. Simultaneously with the beginning of shot 2, the multiplexer starts sending the data $W_0$ through $W_7$ via the memory bus to the cache. If the first element (E) required by the CPU is within $W_0$(remember, the cache is organized in lines), then the data flow is consecutive and there is no first access loss caused by wait transfers (see diagram below).

EXAMPLE 1

First element required by CPU is contained in $W_0$

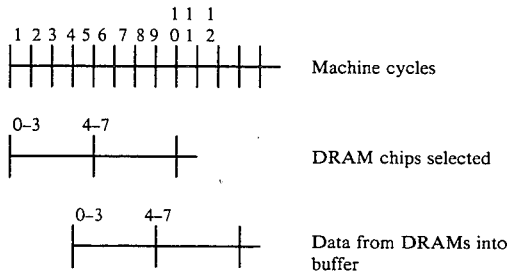

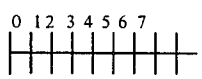

First data in cache (available to CPU) after five machine cycles.

If the CPU wants to start with an element in $W_3$, the decoder selects A03 in shot 1 and A47 in shot 2, as described in example 1. However, the CPU requires an uninterrupted data string. Therefore, the multiplexer has to wait three cycles before it can start transferring data in an uninterrupted sequence. This results in a first access loss of three cycles.

EXAMPLE 2 First element required by CPU contained in $W_3$

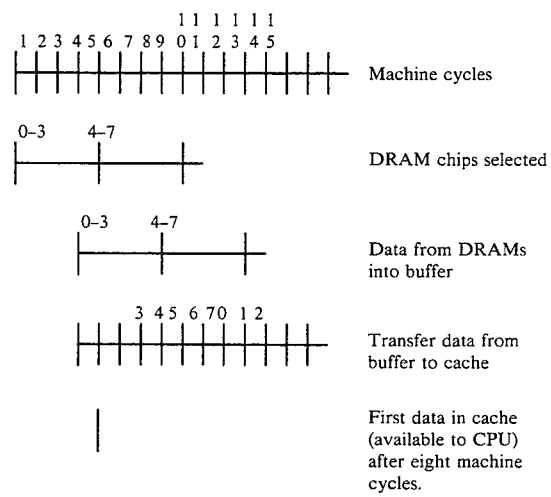

Figure 2:
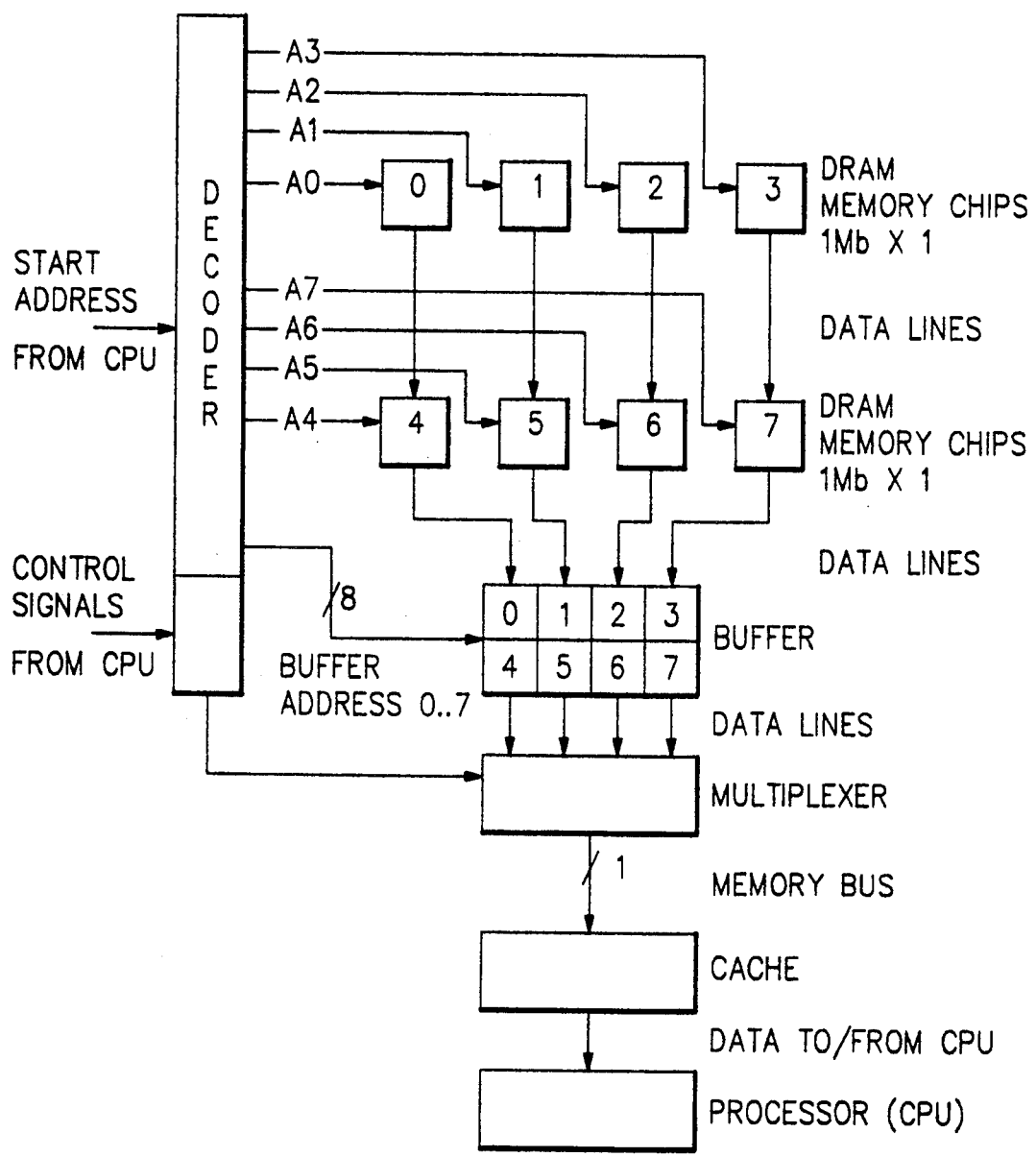
FIG. 2 illustrates a preferred embodiment of the invention including, a new decoder for addressing the memory.

To avoid the access time loss, the addressing scheme shown in FIG. 2 is proposed.

The decoder shown in FIG. 2 has eight DRAM address outputs A0 ... A7 to select the DRAMs which provide one data bit each, and also eight buffer address outputs to select the right buffer cells. This is the main difference between the invention and the state of the art decoder described above and shown in FIG. 1, which provides only two addresses each for the DRAMs and the buffer cells.

Like the decoder in FIG. 1, the decoder in FIG. 2 fills the buffer in two separate shots of four bits each. However, depending upon the first element required by the CPU, the decoder selects the DRAM address lines and buffer address lines according to the following scheme:

| Start address low order bits | Sel. DRAM addr. lines | | Sel. buffer addr. lines | |
|---|---|---|---|---|
| | 1st shot | 2nd shot | 1st shot | 2nd shot |
| 000 | A0, A1, A2, A3 | A4, A5, A6, A7 | 0, 1, 2, 3 | 4, 5, 6, 7 |
| 001 | A1, A2, A3, A4 | A5, A6, A7, A0 | 1, 2, 3, 4 | 5, 6, 7, 0 |
| 010 | A2, A3, A4, A5 | A6, A7, A0, A1 | 2, 3, 4, 5 | 6, 7, 0, 1 |
| 011 | A3, A4, A5, A6 | A7, A0, A1, A2 | 3, 4, 5, 6 | 7, 0, 1, 2 |
| 100 | A4, A5, A6, A7 | A0, A1, A2, A3 | 4, 5, 6, 7 | 0, 1, 2, 3 |
| 101 | A5, A6, A7, A0 | A1, A2, A3, A4 | 5, 6, 7, 0 | 1, 2, 3, 4 |
| 110 | A6, A7, A0, A1 | A2, A3, A4, A5 | 6, 7, 0, 1 | 2, 3, 4, 5 |
| 111 | A7, A0, A1, A2 | A3, A4, A5, A6 | 7, 0, 1, 2 | 3, 4, 5, 6 |

Description of a fetch cycle starting with an element contained in $W_3$.

Figure 3:
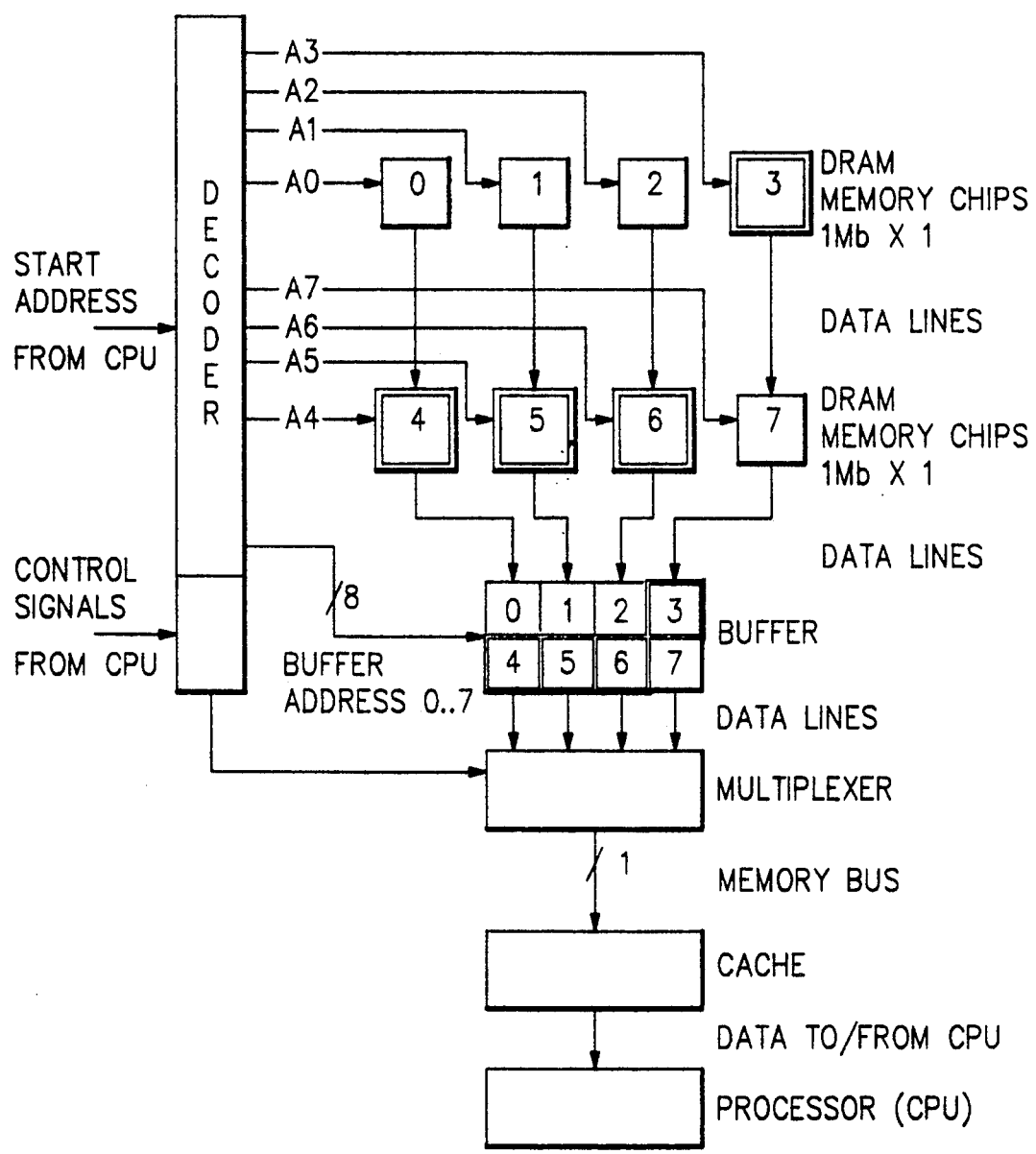
FIG. 3 is a diagram showing the first shot of the method.

As previously stated, the CPU requires $W_3$ first (Start Address Low Order Bits=011).The CPU indicates this to the decoder via the three low order address bits. During the first shot, the decoder activates A3, A4, A5 and A6 and selects the corresponding DRAM chips. Simultaneously the appropriate buffer address lines 3, 4, 5 and 6 are activated to store the data read from DRAM chips in the buffer cells (see FIG. 3).

Figure 4:
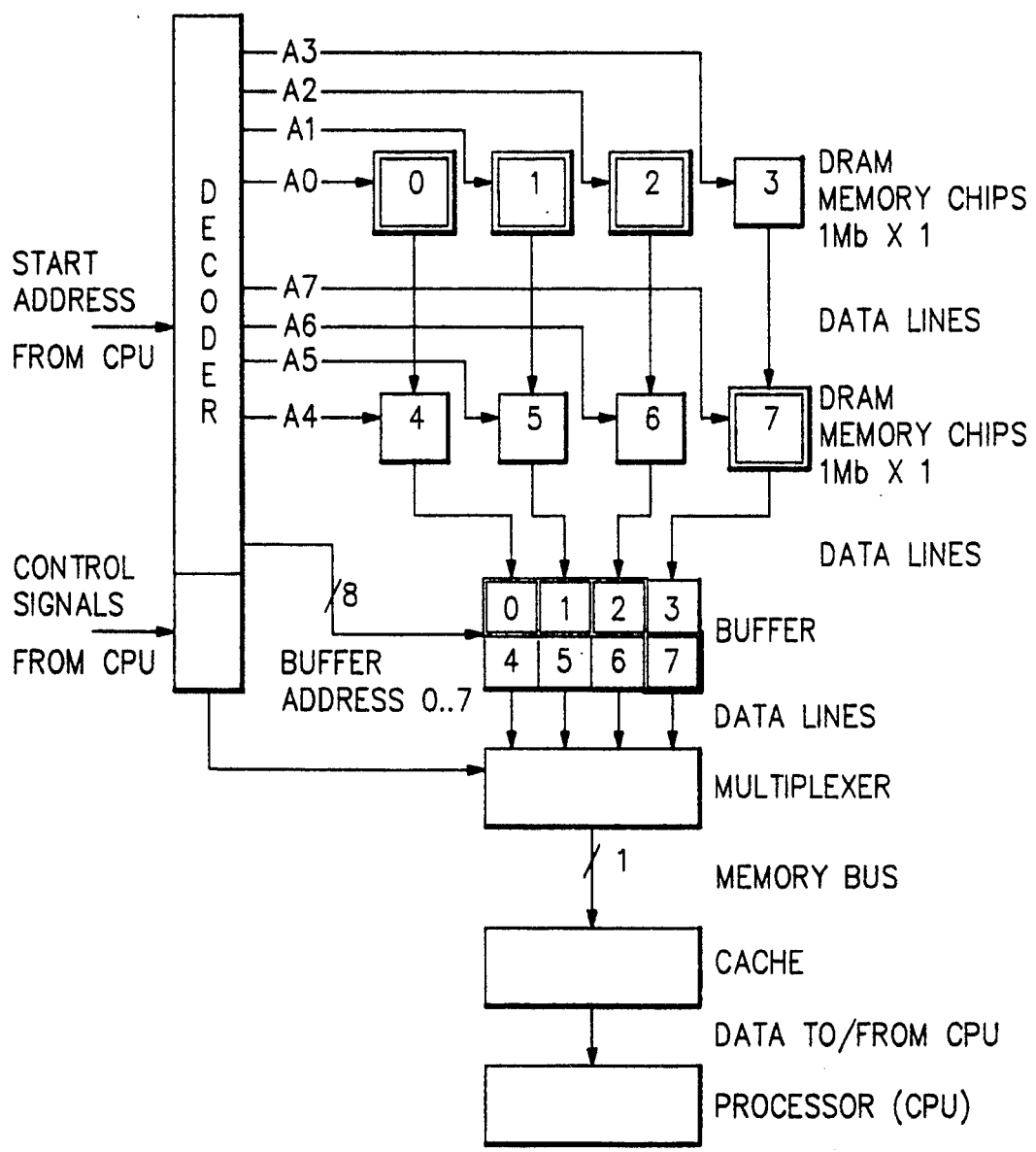
FIG. 4 is a diagram showing the second shot of the method.

During the second shot the decoder selects A7, A0, A1 and A2 and the corresponding buffer cells 7, 0, 1 and 2 (see FIG. 4).

At the beginning of the second shot, the multiplexer will then start the transfer with $W_3$, followed consecutively by $W_4$-$W_5$-$W_6$-$W_7$-$W_0$-$W_1$-$W_2$ (wrap around). As can be seen from the diagram below there is no wait transfer or gap at the beginning or in the middle of the data transfer.

EXAMPLE 3

First element required by CPU contained in proposed scheme applied.

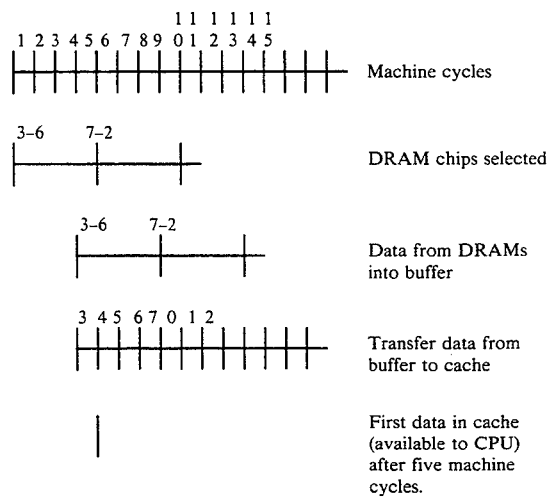

The proposed addressing scheme of the main memory requires a slightly more complex logic in the decoder but it yields a significant improvement in overall system performance.

Each transfer cycle lost or gained during memory access in a cache machine corresponds to about 2% overall performance. In the above described example with 4 memory chips in parallel, the proposed concept will gain on an average two transfer cycles per memory access. This increases the performance by equalling an approximate percentage or revenue.

The invention avoids the boundary wait transfers by very moderate additional hardware means. This makes it possible to load a cache line starting exactly with the first transfer that contains the first element that caused the cache miss, followed by the next transfers. The case of the CPU having to wait for the wait transfers (as indicated above) is avoided.

There are no wait transfers. Every cycle lost or gained during memory access in a cache machine corresponds to about 2% of the overall performance. In an example with 4 memory chips in parallel, the invention will be gaining on an average two cycles per memory access, resulting in a 4% performance increase or an approximately equal percentage of additional revenue.

This method and this apparatus of accessing memory provide a better way than the prior art by achieving a cache line transfer without interruption (seamless data transfer).

What is claimed is:

1. A data mechanism comprising:
   a random access memory having a plurality of groups of memory chips, each group being divisible into two equally sized chip sets, each group being addressed by a first address and each individual memory chip being addressed by a second address, said random access memory having data stored therein;
   a cache connected to said random access memory and having stored therein a portion of data stored in said random access memory and accessed by a cache address for separately reading requested data therefrom, said cache further providing a cache miss signal when the requested data is not stored in said cache;
   CPU means connected to said cache and said random access memory for receiving said cache miss signal and providing responsive thereto, a starting address to said random access memory for starting a block transfer from said random access memory to said cache in two shots, said starting address comprising said first address and said second address, said starting address identifying the group and individual chip within said group which contains the first bit which, when attempted to be read from said cache, caused said cache miss signal;
   decoder means connected to said CPU means and said random access memory for receiving said starting address from said CPU means and enabling a first block data transfer from a first chip set in a first of said two shots starting from said first bit which caused the cache miss signal, and enabling a second block data transfer from a second chip set in a second of said shots, said second chip set including the memory chips remaining in the memory group addressed by said first address whose data was not transferred in said first shot;
   a data buffer connected to said random access memory and said decoder for storing the data transferred from said group of memory chips in said two shots; and
   a multiplexer connected to said buffer and said cache, said multiplexer for serially transferring data from said data buffer to said cache, said multiplexer starting the serial transfer of data from the start of the data transferred from said first set of chips at the beginning of said second shot.

2. The data mechanism of claim 1, wherein:
   said data buffer is divided into a plurality of buffer cells, one for each chip in each group of said groups of memory chips, each buffer cell having a separate address input;
   each set of memory chips having an output for each chip in the set;
   each buffer cell having an input and an output separate from the other cells in the buffer;
   said decoder having a plurality of memory address outputs and a plurality of buffer address outputs;
   a plurality of memory address lines, one memory address line connected to one memory address output of said decoder and one of the groups of memory chips;
   a plurality of data lines connecting the outputs of said memory chips with the inputs of said buffer cells the output from each of the chips of a set connected to a different one of the buffer cells;

a plurality of buffer address lines, one buffer address line connected to one buffer cell address input, the number of memory address lines being equal to the number of buffer address lines such that the data addressed by one memory address line may be placed in a buffer cell addressed by one buffer address line independently of the other buffer cells;

each of the outputs of said buffer cells being individually connected to said multiplexer for transferring data in said buffer cells to said multiplexer independently of one another; and a memory bus connected between said multiplexer and said cache for transferring data from said multiplexer to said cache one at a time in the order in which it was received by the buffer irrespective of the position of the storage cells in the buffer containing the data.

3. In a data mechanism including:

a random access memory having a plurality of groups of memory chips, each group being divisible into two equally sized chip sets, each group being addressed by a first address and each individual memory chip being addressed by a second address, said random access memory having data stored therein;

a cache connected to said random access memory and having stored therein a portion of data stored in said random access memory and accessed by a cache address for separately reading requested data therefrom;

a CPU connected to said cache and said random access memory;

a decoder connected to said CPU means and said random access memory;

a data buffer connected to said random access memory and said decoder; and a multiplexer connected to said buffer and said cache;

a method of conducting a block transfer from said random access memory to said cache, said method comprising the steps of:

providing a cache miss signal from the cache to the CPU when the requested data is not stored in said cache;

responsive to the receipt of the cache miss signal at said CPU, providing a starting address for starting a block transfer from said random access memory to said cache in two shots, said starting address comprising said first address and said second address, said starting address identifying the group and individual chip within said group which contains the first bit which, when attempted to be read from said cache, caused said cache miss signal;

receiving at said decoder, said starting address from said CPU means and enabling a first block data transfer from a first chip set in a first of said two shots starting from said first bit which caused the cache miss signal, and enabling a second block data transfer from a second chip set in a second of said shots, said second chip set including the memory chips remaining in the memory group addressed by said first address whose data was not transferred in said first shot;

storing in said data buffer, the data transferred from said group of memory chips in said two shots;

serially transferring data from said data buffer to said cache by means of said multiplexer, said multiplexer starting the serial transfer of data from the start of the data transferred from said first set of chips at the beginning of said second shot.

* * * * *